UNITED STATES PATENT OFFICE.

JOHN BRYSON ORR, OF GLASGOW, NORTH BRITAIN.

IMPROVEMENT IN THE MANUFACTURE OF PAINT.

Specification forming part of Letters Patent No. 157,864, dated December 15, 1874; application filed October 26, 1874.

*To all whom it may concern:*

Be it known that I, JOHN BRYSON ORR, of Glasgow, in the county of Lanark, North Britain, chemist, have invented Improvements in Obtaining a White Pigment, and in the process employed therefor, of which the following is a specification:

This invention relates to the obtainment of a new or improved white pigment, and to improvements in the process for producing the same.

For the purpose of carrying out this invention crude barium sulphide is lixiviated, and the supernatant liquor drawn off and divided into two or more equal portions. To one such portion an equivalent of zinc chloride is added, and to this is again added an equivalent of zinc sulphate, after which a further equal portion of the solution of barium sulphide is also added, the result being an intimate mixture of one equivalent of barium sulphate and two equivalents of zinc sulphide.

The precipitated compounds or combinations of zinc and barium are collected and pressed to expedite the drying of them, after which they are placed in a retort or furnace and heated to a bright-red heat, and while still hot the product is drawn into water, which it is preferred should be cold.

The sudden cooling thus produced has the effect of increasing the density and imparting body to the product.

The product is now washed and ground in water to a fine powder and dried, or it may be first dried and then ground in a dry state, the result being a white pigment of great purity and body.

By increasing the number of additions of zinc sulphate, the quality of the product may be varied at will until the quality No. 4 is obtained, this being produced in the manner following: The supernatant liquor of the lixiviated barium sulphide is divided into five equal portions. To the first portion is added an equivalent of zinc chloride, or nitrate of zinc may be used instead of the chloride, after which there is poured into the vessel containing them, first, one equivalent of zinc sulphate; second, the second portion of barium-sulphate liquor; third, one equivalent of zinc sulphate; fourth, the third portion of the said liquor; fifth, one equivalent of zinc sulphate; sixth, the fourth part of the said liquor; seventh, one equivalent of zinc sulphate; eighth, the fifth part of the said liquor.

The resulting mixed precipitates will thus consist of four equivalents of barium sulphate to five equivalents of zinc sulphide.

In order to obtain quality No. 5 I add one equivalent of zinc sulphate to one equivalent of barium sulphide, thus obtaining a precipitate containing one equivalent of barium sulphate to one equivalent of zinc sulphide.

The precipitates produced under the two last-mentioned modes of working my process for obtaining qualities No. 4 and 5 are then heated in a retort, and otherwise treated in the manner set forth with reference to the precipitates herein first described.

It is, however, to be understood that the pressing of the collected precipitates hereinbefore mentioned may be dispensed with, in which case the water is separated from them by evaporation.

I claim—

The process of manufacturing white pigment, consisting in dividing barium-sulphate liquor into equal parts, precipitating first by zinc chloride or nitrate, and then by zinc sulphate with said parts of liquor, successively, and then calcining and cooling the precipitates, all as set forth.

In testimony whereof I have signed my name to this specification in the presence of two subscribing witnesses.

JOHN BRYSON ORR. [L. S.]

Witnesses:
DAVID DRYSDALE AUSTEN,
GEORGE MACAULAY CRUIKSHANK.